United States Patent [19]

Johnson et al.

[11] 3,959,636
[45] May 25, 1976

[54] BATCHING SYSTEM

[75] Inventors: Bernard A. Johnson, Deerfield; Roy W. Klein, Hoffman Estates; Frederick Philip Gardner, Wonder Lake, all of Ill.

[73] Assignee: Mangood Corporation, Chicago, Ill.

[22] Filed: Mar. 10, 1975

[21] Appl. No.: 556,881

[52] U.S. Cl. .......................... 235/151.33; 177/70; 340/172.5
[51] Int. Cl.² ................... G01G 19/22; G06F 15/20
[58] Field of Search ............ 235/151.33; 340/172.5, 340/213 Q; 177/3, 4, 60, 68, 70, 81, 122, 123; 445/1

[56] References Cited
UNITED STATES PATENTS

| | | | |
|---|---|---|---|
| 3,362,490 | 1/1968 | Maxwell | 177/70 |
| 3,595,328 | 7/1971 | Grien, Jr. | 177/70 X |
| 3,708,026 | 1/1973 | Senour | 177/60 |
| 3,821,715 | 6/1974 | Hoff, Jr. et al. | 340/172.5 |

*Primary Examiner*—Edward J. Wise
*Attorney, Agent, or Firm*—Claron N. White

[57] ABSTRACT

A batching system for operating each cycle of a batching process includes a communications bus to which are connected a basic processor, a control console, an analog/digital converter module, and an interface unit. The basic processor includes RAM memory means, PROM memory means and a central processing unit containing a microprocessor. The control console includes display means, a group of set-up pushbutton switch means, a group of operate pushbutton switch means, keyboard means having a number of pushbutton switch means each providing a different BCD signal, and switch means to activate alternatively the group of set-up pushbutton switch means or the group of operate pushbutton switch means. When the set-up pushbutton switch means are activated, the pressing of each button activates a different mode of the PROM memory means. By operating these switch means followed by operation of one or more buttons of the keyboard changes can be made in the digital information stored in the RAM memory means. Information stored in the RAM memory means relevant to a pushbutton is displayed on the console and changed when the keyboard is operated.

11 Claims, 4 Drawing Figures

BATCHING SYSTEM

BACKGROUND OF THE INVENTION

1. Field of the Invention

The field of the invention is batching systems for controlling and monitoring batching processes in which two or more ingredients are brought together in predetermined amounts and mixed to provide a product having a specific formula.

2. Description of the Prior Art

The control and monitoring of batching processes for many years have used a number of different designs on relay logic, electromechanical timers and controllers, and solid state logic. These systems generally use punched paper tape or card readers to control formulas or recipes to be batched. This equipment is often unreliable and the cards and paper are subject to wear. Confirmation of formula data is difficult to determine visually.

In more recent times batching systems using computers for the control of batching processes have been used successfully but such batching systems, due to the cost of computers, is justified only for a large-scale batching operation. The availability of mini-computers as a substitute for computers has not permitted extension of use of the batching system to small-scale batching process equipment. Those systems have used various combinations of large process computers or mini-computers, disks, drums, CRTs, line printers, large grapical panels, etc.

SUMMARY OF THE INVENTION

The batching system of the present invention is useful for the control and monitoring of a batching process which can be described as follows with reference to equipment in which the process is performed. The equipment contains a number of silos or storage bins or tanks. The number of silos corresponds at least to the number of ingredients of the various formulas to be made by the batching process. The ingredients are fed from selected silos, one at a time, by individual feeders to the weigh hopper. The latter is supported on load cells so that the weight of the material added can be determined as an analog signal that is converted to a digital signal. When a predetermined amount of an ingredient has been fed to the hopper the corresponding ingredient feeder is shut off. The feeder for the next ingredient is energized. When the complete formula has been batched, it is mixed in the hopper or preferably fed to a mixer. The mixture of ingredients is then dumped. The feeding of the next batch can be initiated as soon as the weigh hopper is empty. If the mixing is in a mixer, the feeding of the ingredients of another batch can be initiated as soon as the batch has been transferred from the hopper to the mixer. Thus a batch is being mixed in a mixer while another batch is being fed to the hopper. The mechanical hardware, such as silos, feeders, gates, diverters, etc., can be of any type and manufacture as long as they have facilities for electrical monitoring and control.

The batching system of the present invention is a system that is sufficiently inexpensive to justify its installation for the control and monitoring of equipment for a small-scale batching operation that would not justify the cost of an installation of prior systems for a large-scale operation, i.e., systems that use a large computer or a minicomputer and their required associated equipment such as disks and drums.

The batching system of this invention is one that permits the operator, without any skill in the art of programming of a computer or minicomputer, to set up the storage of information regarding various formulas, to make changes in stored information of weights of ingredients of specific formulas and to make other desired changes in stored information relative to process conditions simply by pressing buttons. This operator can check each of his operations by viewing a display located at the site of these pushbuttons. The system also allows him to replace stored information of one formula by information of another formula without preparing cassettes or cards and allows him to check the change at the time it is made. With the system the operator can follow the sequence of the steps of the batching process and halt the operation of the batching process without moving from the location at which he programs or changes the program of operation of the process and can change or replace formulas and conditions of the process.

The system of the present invention permits an easy change of the sequence of the feeding of ingredients to the weigh hopper of the equipment used in the batching process. The system can be readily changed by the operator to change, for subsequent batches of a formula, the times of operation of certain steps of the operation of the equipment used in the batching process. The operator can adjust during a particular cycle of operation the amount of any ingredient being fed to introduce more exactly the desired weight of such ingredient.

The system of the invention can incorporate in its construction a capability of providing a diagnostic mode to check the operability of various components by a simple switching on the part of the operator followed by utilizing the same pushbuttons utilized by him to control the various functions during a cycle of operation of the process when it is in a semiautomatic mode of operation.

The foregoing and other advantages of the system of the invention will be apparent from the description that follows.

The system of the invention includes a communications bus (also called a common bus), a basic processor, a control console, an analog/digital converter module and an interface unit. The processor, console, module and interface unit are connected to the communications bus. The control console alone is contemplated as another aspect of the invention.

The basic processor of the system includes RAM memory means, PROM memory means and a central processing unit containing a microprocessor. The PROM memory means includes programmable read only memories (usually called PROMs and sometimes called P/ROMs, pROMs), i.e., PROM chips, that store the permanent operating portions of a program for the batching process. The RAM memory means includes random access memories (RAMs), i.e., RAM chips, that store all ingredient parameters of formulas and other changeable portions of the operating program. The central processing unit (CPU) performs all of the control and logic functions of the system. It directs operations based on programs stored in the PROM and RAM memories. A number of PROM chips and a number of RAM chips are mounted on separate printed circuit boards with associated decoder circuits. These circuit boards are designated PROM circuit boards and RAM circuit boards, respectively.

The CPU (central processing unit) contains a CPU chip and various other control and timing logic circuits that are mounted on a printed circuit board. The CPU chip is an 8-bit parallel processor that contains registers, an accumulator, flag bits, an arithmetic unit, a 14-bit program counter, and a memory stack containing seven 14-bit words of memory. Time multiplexing of the 8-bit parallel bus of the communications bus permits communication between the CPU chip and any location in memory or any control information.

Each RAM chip is a multi-word by one bit static random access semiconductor memory element integrated with its associated control logic on a monolithic array. Data are read out nondestructively and the output data from a RAM circuit board have the same polarity as the input data. The RAM memory means are used to store the operator's input program from the control console and all processing data. The decoder circuits control the addresses for all the eight-bit words on each RAM circuit board. The decoder circuits contain DIP switches that are set for the desired address numbers.

Each PROM chip is a multi-word by 8-bit static programmable read only semiconductor memory element integrated with its associated control logic with its monolithic array. The PROM memory means are used to store the permanent operating program of the system as mentioned above. Part of the operating program is written into the PROM chips before the use of the system and that part of the program differs for different applications of the system in which different sets of steps are performed, each with different equipment that performs a batching process in a somewhat different manner.

The analog/digital converter module of the system has its output signals sent to the communications bus by having the outputs of the converter connected to buffer amplifiers mounted on an input circuit board that also contains addressed decoder circuits containing DIP switches that are set to accept circuit addresses that control the buffer amplifiers. These amplifiers are connected to the communications bus. This circuit board and other circuit boards, including those mentioned above, are located in a chassis on which these boards and the control console are mounted. The analog/digital converter has its input connected during use, to the load cell of the weigh hopper. The converter resolves the load cell input voltage into a number of binary bits that are stored in a data register. This digital information is thereby available at the output of the A to D converter module to the input circuit board as a binary output.

The equipment for batching process includes gate and feeder position detectors, etc., that provide input signals to the system of the invention by providing these signals to the interface unit. Output signals from the system of the invention are provided through the interface unit as relay outputs to feeders, gates, mixer, etc.

The interface unit has the function of coupling the process controls of the equipment for batch processing to the basic processor. The interface unit is connected to input and output circuit boards that are connected to the communications bus to provide this coupling by the interface unit to the communications bus.

The novel control console of the system of the invention includes display means, a group of set-up pushbutton switch means, a group operate pushbutton switch means, keyboard means having a number of pushbutton switch means each providing a different BCD signal, and switch means to activate alternatively the group of set-up pushbutton switch means or the group of operate pushbutton switch means.

Each of the set-up pushbutton switch means is operative when that group is activated to activate a different mode of the PROM memory means. Similarly, each of the operate pushbutton switch means is operative when that group is activated to provide another different mode of the PROM memory means. Each of the group of set-up pushbutton switch means and each of the group of operate pushbutton switch means is connected to the communications bus in the following manner. Each of the groups of set-up and operate switch means includes at least one matrix circuit board. The matrix circuit board or boards for each group of pushbutton switch means are connected to each of the pushbutton switches of the group of pushbutton switch means and that matrix circuit board or boards are connected to an input/driver circuit board of the basic processor. That input/driver circuit board contains address decoder circuits and is connected to the communications bus. These input matrix circuit boards of the groups of set-up and operate pushbutton switch means serve as an interface between these pushbutton switches and that input/driver circuit board.

The keyboard means includes an input matrix circuit board and pushbutton switches. These switches and this board constitute pushbutton switch means. The board is connected to an input driver circuit board. Each pushbutton is connected to the input matrix circuit board to convert the signal when the button is depressed to a BCD signal. Thus each switch when operated provides a different BCD output signal from the keyboard means to an input/driver circuit board of the basic processor and that circuit board is connected to the communications bus.

The control console has a panel that preferably has a lower inclined panel section and a generally vertical upper panel section. The two groups of set-up and operate pushbutton switch means and the keyboard means are mounted on the lower panel section.

The switch means, of the console, that activates alternatively the group of set-up pushbutton switch means or a group of operate pushbutton switch means has two positions that provide this alternative activation of the two groups. When the switch means is in either of these two positions it provides an appropriate signal to the communications bus through one of the input/matrix circuit boards and thereby to one of the input/driver circuit boards, that are connected to the bus as mentioned above. This provides a signal to one of the PROMS so that it sends programmed instructions to the CPU. Of course, the signal to the PROM is dependent on the position of the switch means. In the preferred construction the switch means that actuates alternatively the two groups of set-up and operate pushbutton switch means is also mounted on the lower panel section. The input matrix circuit boards for the groups of pushbutton switches, for the keyboard means and for the switch means are mounted on the back side of the lower section of the panel while the pushbuttons and switch extend from the other side of this panel section.

The console has its display means mounted on the generally vertical upper panel section so that the displayed information is more readily readable by the person who normally operates the pushbuttons, etc., from a sitting position and follows the cycles of operation of the batching process while at that seated position. In the preferred construction the lower panel section mounting the pushbutton switch means, etc., is inclined downwardly and forwardly from the bottom of the upper panel section. By this arrangement a seated operator can readily press a button and then see the displayed information and see the changed information after he has pressed one or more other buttons.

In the preferred construction of the system the console includes, in addition to the panel, a chassis on which it is mounted. Behind the display panel section the various components of the basic processor are mounted on the chassis along with the communications bus.

The display means of the control console includes means to provide a numerical display of a number identifying a formula, an ingredient of the formula, the weight of that ingredient or of the process conditions being checked through the pressing of the pushbuttons of the group of set-up buttons and the change by using the buttons of the keyboard means. The display means preferably further includes means to provide an alphanumerical display that displays to the operator the function of the numerical information stored in a part of the RAM means or part of the storage that has been addressed by pressing a pushbutton of that group. The numerical and alphanumerical display means provide useful display during the batching process.

The panel containing the display means also contains a schematic representation of equipment used in the batching process and process flow. In that representation a number of lamps are mounted to represent the status of various components of the equipment used in the actual batching process. These lamps and the display means mentioned above are connected to output/driver circuit boards that are connected to the communications bus. These circuit boards are also mounted on the chassis of the control console and each circuit board contains addresses, decoder circuits, latch circuits and driver circuits. These address decoder circuits contain DIP switches that are set to accept certain addresses that control the address latches so that data from the communications bus are fed through the latches and drivers to the lamps and to the display means. These data in the communications bus are from the interface unit and the A/D converter.

DESCRIPTION OF THE DRAWINGS

The control console of the present invention and the batching system of the invention using this control console are shown as a preferred embodiment in the drawings.

DETAILED DESCRIPTION

Figure 1:
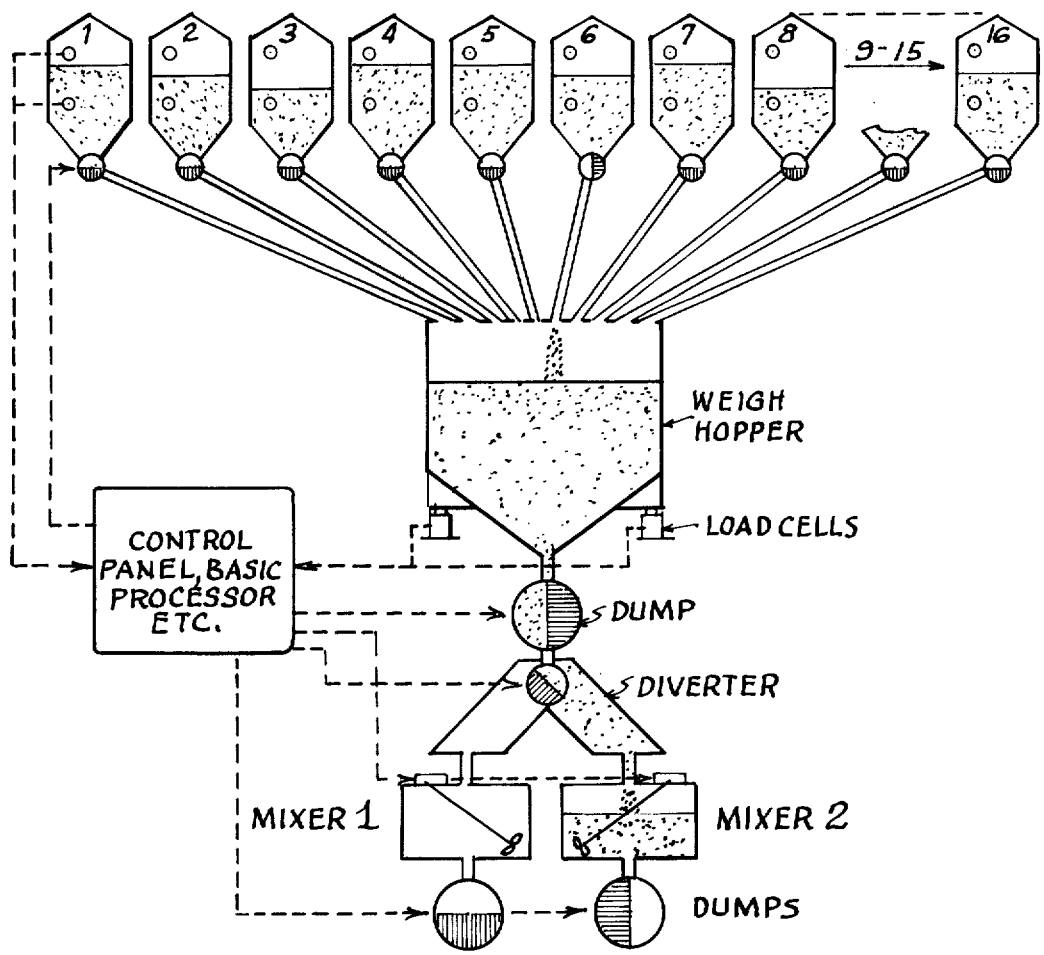
FIG. 1 is a schematic representation of the equipment for an illustrative batching process and a schematic representation of the control and monitoring of the process by the system by information between the system and the batching equipment.
Figure 3:
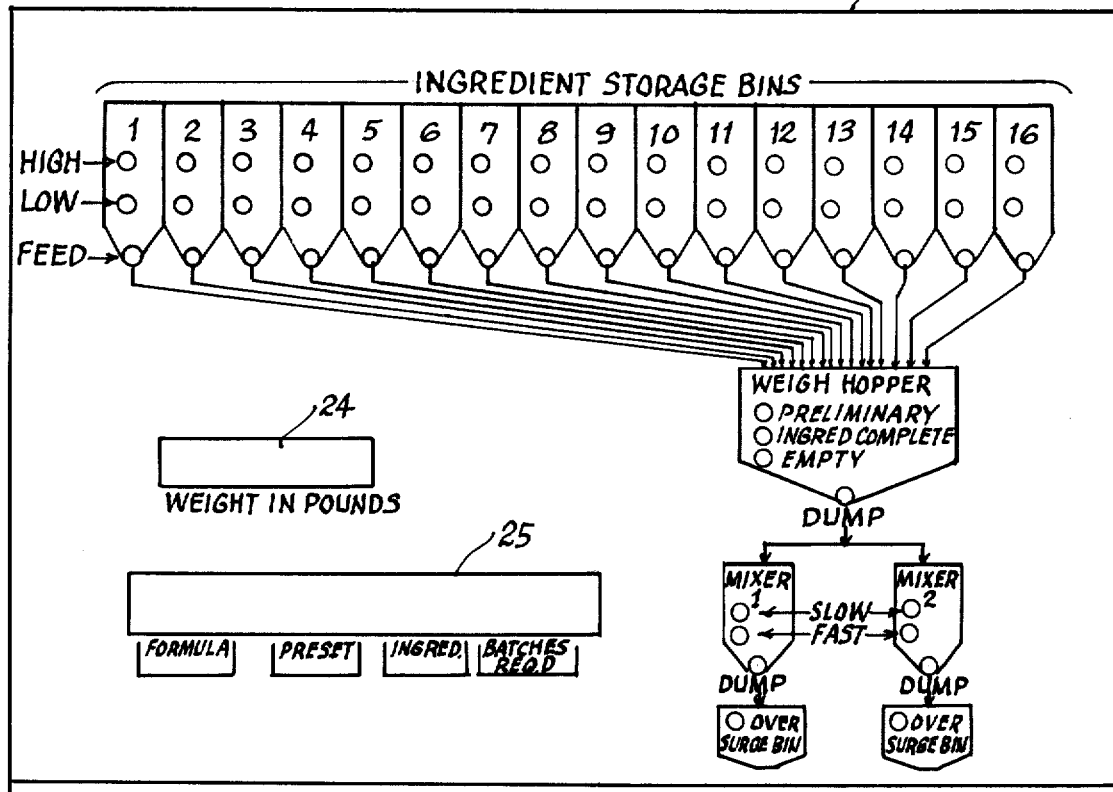
FIG. 3 is an operator's view of the two panel sections of the panel of the control console of the invention. The upper section has the display means and a schematic representation of the equipment for an illustrative batching process, along with a suitable location of the lamps that provide status information relative to various conditions and components of the equipment.
Figure 3:
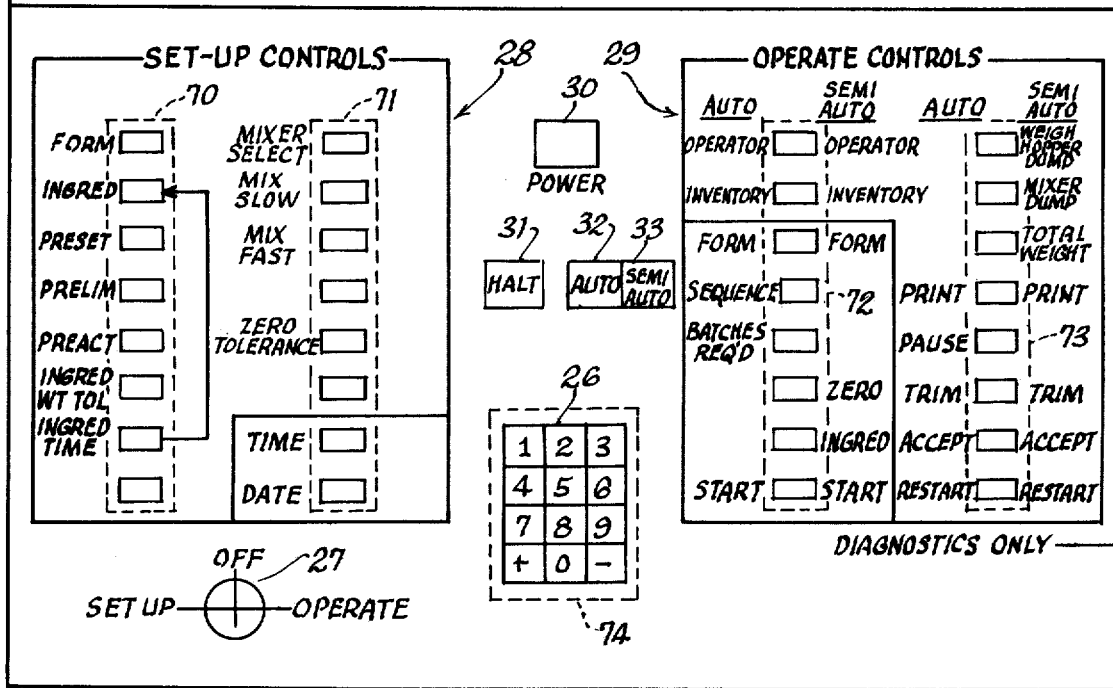

The embodiment of the batching system of the present invention, that is shown in the drawings, is based on the use of the system to control and monitor the feeding of ingredients from 16 storage bins (FIGS. 1 and 3). Each bin is assigned a number that is the reference number for the ingredient in that bin. Each of the gates at the bottom of these storage bins is assigned a number, that for simplicity is the same number as the bin. Each bin has a high level sensor and a low level sensor and the high level and low level sensors for each bin is assigned a number that for simplicity is the same number as the bin. The equipment for the batching process includes separate feed conveyors to transfer ingredient separately from the various storage bins. The upper panel section shows schematically these bins and the conveyor lines that extend to a weigh hopper having a gate at its bottom for transfer alternatively to mixer 1 and mixer 2. Each of these mixers has a gate for transfer of, i.e., dumping, the mixed product from the mixer to a storage surge bin.

Each feed conveyor can operate at two speeds. At the start of the conveyor to feed a particular ingredient the faster speed is the mode of operation. The condition under which there is a change in speed is described later. On the upper panel section within the schematic display of the weigh hopper there are located three lamps that are identified in FIG. 3. When any one of the feed conveyors is operating and is doing so at the faster speed the lamp identified as preliminary is lit by the system of the invention as described later. When a feed conveyor is transferring ingredient from its associate storage bin the gate associated with the bin has been opened and the sensor for this condition of the gate provides a signal through an interface unit 20 (FIG. 2) to signal a basic processor 21 (also FIG. 2) whereby the feed lamp (not numbered) associated with that gate of the corresponding bin is lit. It is seen in FIG. 3 that there are 16 feed lamps. Each feed lamp is associated with a storage bin as seen in the display on the upper panel section in FIG. 3.

The high and low sensors of each storage bin provides, respectively, a signal through interface unit 20 to basic processor 21 when the bin is loaded to the high level desired or when the ingredient in the bin has been depleted to the lowest level desired. Within the graphical representation of each storage bin on the upper panel section of the control console are mounted two lamps (not numbered). The upper lamp is identified as a high level and a lower one is identified as a low level relative to the status of the ingredient in that bin. When the quantity of ingredient being loaded into a particular bin reaches the highest level desired the high level sensor provides through the interface unit a signal to the system of the invention that provides an output signal to the upper of these two lamps so that it is then lit. When a sufficient amount of ingredient has been fed from bin to the weigh hopper, the low level sensor in that bin provides a signal through the interface unit 20 to basic processor 21 that provides an output signal to light the low level lamp. It is seen that a visual observation of the high level and low level lamps provides an operator with information regarding the status that a sufficient quantity of ingredient has been fed to the storage bin when the high light is lit and the supply in the storage bin is sufficiently low when the low level light is lit that a formula requiring it should not be processed until ingredient is added to that bin.

Within the graphical display of the weight hopper on the upper panel section of the control console two additional lamps are mounted and suitably identified. One is lit when the transfer of ingredient from a storage bin has been completed in accordance with the program that is monitored and controlled by the system of the invention. The other lamp is lit when the weigh hopper is empty and this lamp is lit after a batch of ingredients has been fed to the weigh hopper, the gate to dump this batch has been opened, and material has completely passed from the hopper toward mixer 1 or mixer 2. As seen in FIG. 1, the weigh hopper is mounted on load cells that provide an analog voltage signal. The system of the invention determines from its monitoring of this analog voltage when the weigh hopper is empty and when it does so it provides a signal to cause the third lamp within the graphical representation of the weigh hopper to be lit.

At the bottom of the graphical display of the weigh hopper is another lamp that is lit when the gate of the weigh hopper is open. A sensor provides a signal when this condition of the gate is attained. The gate is opened and closed under the control of the batching system that programs the operation of this gate as well as those of the gates for the storage bins and the operation of the feed conveyors, etc.

At the time that the gate of the weigh hopper is opened to dump the ingredients from it to a diverter (FIG. 1) that transfers the dumped ingredients to mixer 1 or mixer 2, the status of the diverter determines the mixer to which the ingredient is transferred. That status of condition of the diverter is determined by the program in the system of the present invention as described later. Each mixer has a motor-driven mixing device that admixes the combination of two or more ingredients fed from the weigh hopper. The period of time of mixing is predetermined by the program in the batching system. The operation of mixing device can be at slow speed or fast speed or a combination of both speeds for times programmed at the control console for the formula being prepared. That program is stored in RAM memories of the system. The speed of mixing is displayed as fast or slow by two lamps on the upper panel section of the console. There are two lamps for each mixer and they are shown in graphical representation with an identifying legend for each on the panel as is the case for all of the lamps on the upper panel section. Thus the operator can identify the status of the mixing part of a cycle of operation of the batching process in that mixer. At the completion of the total time of mixing programmed by the batching system it provides a signal to interface unit 20 that functions to open the gate at the bottom of that mixer for a dumping of the mixture of ingredients as a product to a surge bin associated with that mixer. When this is opened a sensor signals the batching system that provides a signal that lights a dump lamp on the upper panel section of the control console. That lamp is located at the bottom of the graphical representation of that mixer.

Whenever a surge bin associated with a mixer becomes overloaded with a quantity of the formula a sensor mounted on the bin provides a signal through interface unit 20 to basic processor 21 that produces a signal to light a lamp on the panel within the graphical representation of that surge bin.

The foregoing has described various lamps that are mounted on the upper panel section of a control panel 22 of the control console of the invention. This upper panel section is generally vertical. Below it and extending forwardly from the bottom of that upper panel section is a lower panel section that is slanted.

In addition to the graphical display of the process by the lamps mounted as described above, the upper panel section also includes a numerical display 24 and an alphanumerical display 25. Mounted on that panel section below these displays are various alphabetical indicia that relate to nature of the digital information shown on display 25 during the set-up of a cycle of operation or shown during an actual operation of a cycle. The display 24 is a 6-digit numeric display and display 25 is a 16-character alpha-numeric display. Each digit of display 24 is a 7-segment display. The display 25 is a self-scanning type panel unit. Each character is displayed by a 5 × 7 dot matrix.

The lower panel section of panel 22 has various alphabetical information on its front face as seen in FIG. 3. On the lower panel section are mounted two groups of pushbutton switch means, other pushbutton switch means, keyboard means 26 having a set of pushbutton switch means, and a key switch means including a 3-position key switch 27. The three positions of key switch 27 are identified by indicia on the lower panel section as OFF, SETUP, and OPERATE.

The pushbuttons of the groups of pushbutton switch means, of the other pushbutton switch means, and of the keyboard means extend about the front face of the lower display panel section. The pushbuttons and thus the pushbutton switch means of one group are located in the illustrative embodiment in one zone at the left hand portion of the lower panel section and the other group are located at the right hand portion of the lower panel section.

The left hand group generally indicated at 28 are used by the operator to provide information to RAMs for each formula and some of the conditions for the operation of the equipment of the batching process when making a quantity of product of that formula. Some of these pushbuttons are used also to make various changes in such stored information. For this reason the group of pushbuttons are within a rectangular line on the panel section identifying this group as SET-UP CONTROLS. Each button within that rectangular marking is also identified as the function of that pushbutton switch means. In this illustrative embodiment there are two buttonswitch means in this group that do not function to store information regarding the process but rather that provides information that can be stored and then printed out during a cycle of operation if such printing is programmed.

The right hand group generally indicated at 29 includes two pushbuttons of pushbutton switch means that are used by the operator to choose the formula to be used in a cycle of operation and to start a cycle. This group has these pushbuttons and other pushbuttons located in a rectangular area identified as OPERATE CONTROLS. Many of the other pushbuttons are buttons of switches that relate to various functions of operation of the batching process and can be used to control this operation.

The pushbuttons of the two groups, the other pushbuttons including those of keyboard means 26 are identified by words or abbreviations of words on the lower panel section adjacent these buttons or by words or numbers on pushbuttons. The functions provided by the pressing of each of these pushbuttons is described below.

For group 29 it is noted in FIG. 3 that there are indicia AUTO and SEMIAUTO. Under each column heading there are words for the function that the pressing of each pushbutton provides. It is noted further that some of the buttons of the group are used for either an automatic (AUTO) mode or a semiautomatic (SEMIAUTO) mode of operation and some are used for only one of these modes of operation of the batching equipment. The function of automatic or semiautomatic is determined by which of the pushbuttons designated AUTO and SEMIAUTO is depressed. These two buttons are in the central portion of the lower panel section between the two groups of pushbuttons mentioned above. In this central portion of the lower panel section there are also pushbuttons, designated POWER and HALT, of two other switch means and the keyboard pushbuttons of keyboard means 26.

Below the group of the pushbuttons of OPERATE CONTROLS there is shown on the lower panel section in FIG. 3 the designation DIAGNOSTICS ONLY and an arrow to the column of words to the right of that panel section. The words DIAGNOSTICS ONLY, the arrow and that column of words are presented in FIG. 3 merely to indicate the switches of the right hand column of group 29 used in diagnosing for different malfunctions as described later.

The following is a description of the functions of the various switch means having their pushbuttons on the lower panel section of panel 22 of the control console that are shown in FIG. 3. A POWER pusbutton switch means 30 has a locking-type pushbutton switch with a lamp in its button. When this button is depressed the internal lamp is lit and ac power is applied to the system. This is the only button that has an internal lamp. A HALT pushbutton switch means 31 has a non-locking-type pushbutton switch. This switch is connected to an input of a circuit of a matrix circuit board that is described later. That circuit is a part of HALT switch means 31. AUTO and SEMIAUTO pushbutton switch means 32 and 33, respectively, have locking-type pushbutton switches that mechanically function together as a unit. When one button is fully depressed the other button releases and vice versa. The AUTO button when depressed activates the automatic mode of operation of the system and connects all switches having pushbuttons with labels or indicia under the AUTO columns in group 29 to basic processor 21. The SEMIAUTO button of switch means 32 when depressed activates the semiautomatic mode of operation of the system and connects all switches having pushbuttons with labels or indicia under the SEMIAUTO columns in group 29 to basic processor 21. These two pushbutton switches are connected to other circuits of the input matrix circuit board mentioned above in connection with the HALT pushbutton switch means 31. That matrix circuit board provides an output signal to the basic processor for activation of the automatic or semiautomatic mode depending upon which pushbutton is depressed.

The switch of key switch means 27 is a key-operated switch. A key must be inserted in order to operate the switch. The key can be removed at any position of the switch. When the key is in the SET UP position, the words SET UP appear on display 25 and group 28 of pushbutton switch means is activated. When the key is in the OPERATE position the word OPERATE appears on display 25 and group 29 of pushbutton switch means is activated. In the OFF position the system is in the diagnostic mode mentioned above.

The keyboard means 26 includes 12 non-locking-type pushbutton switches that function with both the switch means of group 28 and some of the switch means of group 29. Each switch of keyboard means 26 is connected to a circuit of the input matrix circuit board mentioned above. As each keyboard button is pressed, after one of group 28 or one of some of group 29 has been pressed, a BCD digit representing a number of a pressed keyboard button is provided as an output signal of the input matrix circuit board and that signal is sent to the basic processor. This circuit is a part of keyboard means 26.

Figure 4:
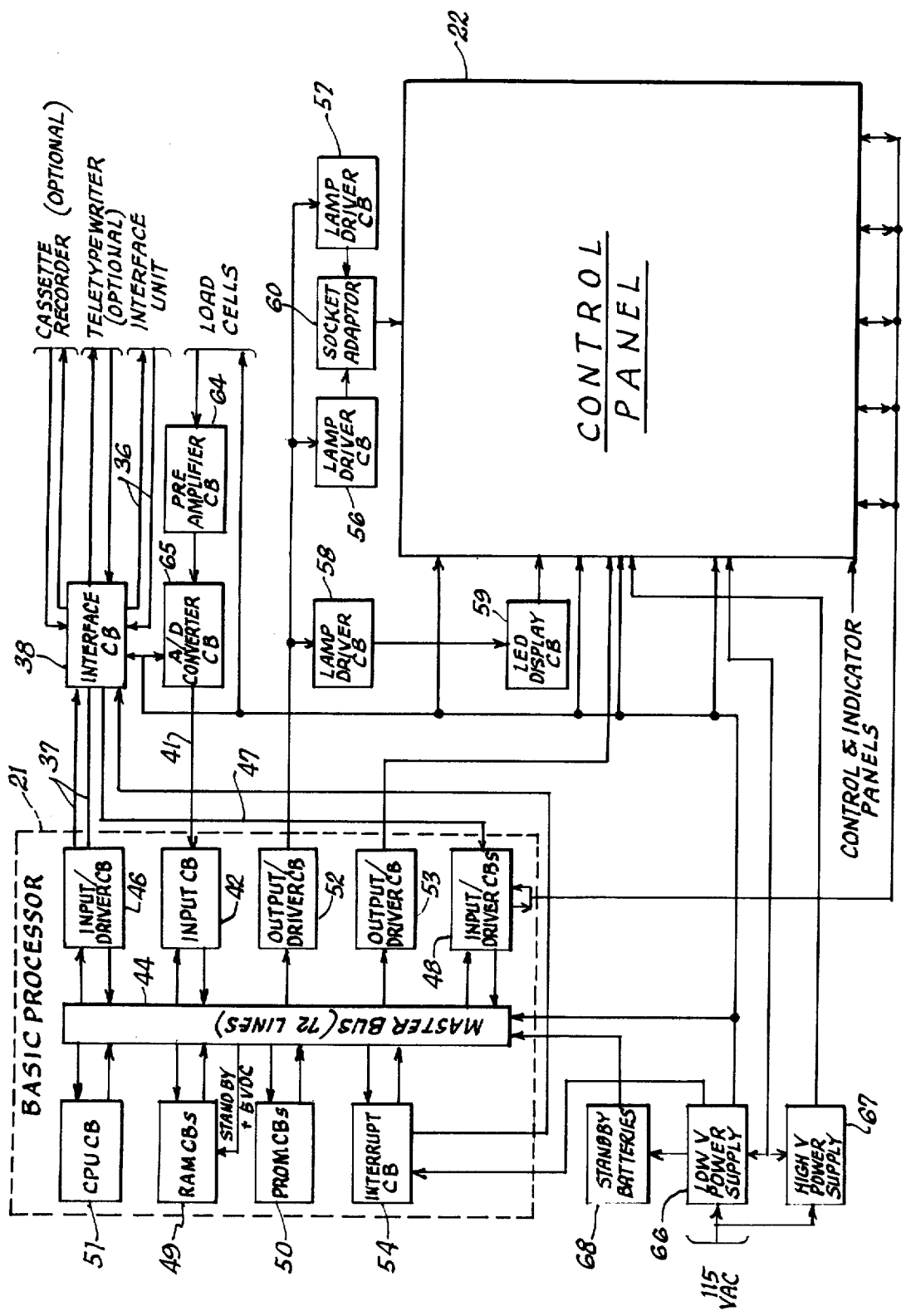
FIG. 4 is a block diagram of the control console in block form, components of the analog/digital converter module and components of the basic processor.

When any pushbutton of group 28 is pressed its associated routine in basic processor 21 is activated. These routines are stored in the PROM memory means of PROM circuit boards 32 (FIG. 4). Any of the thus activated routines will accept BCD digit inputs from keyboard means 26. These digit inputs will replace any existing numbers and the new stored number will appear in display 24. However, if the existing stored numbers shown on display 24, when one of the buttons of group 28 is pressed, is satisfactory, none of the buttons of the keyboard means is pressed.

Each of the pushbutton switch means of SET-UP CONTROLS group 28 is connected to a different input of input matrix circuit boards that are mounted on the back of the lower panel section of panel 22. These matrix circuit boards constitute a part of each of the pushbutton switch means of this group. The function of each pushbutton switch means of group 28 is described below by reference to the button of each of these pushbutton switch means. The switch of each switch means is the non-locking type.

When the FORM button is pressed, the formula routine in the PROM memory means is activated. The word FORMULA appears on display 25 and the existing identifying formula number appears on display 24. The existing formula number may be superseded by operating the keyboard to provide a BCD signal corresponding to the number assigned to the desired formula.

When the INGRED button is pressed, the ingredient routine in the PROM memory means is activated. The word INGREDIENT appears on display 25 and the existing identifying ingredient number appears on display 24. The ingredient number indicates the associated bin from which the ingredient will be fed. The existing ingredient number may be advanced by pressing the INGRED button or may be superseded by operating the keyboard to provide a BCD signal corresponding to the number assigned to the desired ingredient.

When the PRESET button is pressed, the preset routine in the PROM memory means is activated. The word PRESET appears on display 25 and the existing preset number appears on display 24. The preset number represents the final required weight (lb. or kg.) for one ingredient in a particular formula. The existing preset number may be superseded by operating the keyboard to provide a BCD signal corresponding to the number assigned to the desired weight.

When the PRELIM button is pressed, the preliminary routine in the PROM memory means is activated. The word PRELIMINARY appears on display 25 and the existing preliminary number appears on display 24. The preliminary number represents the weight difference between the preset weight and the preliminary weight. The preset weight minus the preliminary number represents the ingredient weight (lb. or kg.) at which point the associated feeder reduces speed. The existing preliminary may be superseded by operating the keyboard to provide a BCD signal corresponding to the number assigned to the desired preliminary number.

When the PREACT button is pressed, the preact routine in the PROM memory means is activated. The word PREACT appears on display 25 and the existing preact number appears on display 24. The preact number represents the weight difference between the preset weight and the preact weight. The preset weight minus the preact number represents the ingredient weight (lb. or kg.) at which point the associated feeder stops to allow for the weight of the airborne ingredient between feeder and weigh hopper. The existing preact number may be superseded by operating the keyboard to provide a BCD signal corresponding to the number assigned to the desired preact number.

When the INGRED WT TOL button is pressed, the weight tolerance routine in the PROM memory means is activated. The words WEIGHT TOLERANCE appear on display 25 and the existing weight tolerance number appears on display 24. The weight tolerance number represents the allowable ingredient weight (lb. or kg.) variation from the preset value. The existing weight tolerance number may be superseded by operating the keyboard to provide a BCD signal corresponding to the number assigned to the desired weight tolerance number.

When the INGRED TIME button is pressed, the ingredient time routine in the PROM memory means is activated. The words INGREDIENT TIME appear on display 25 and the existing ingredient time number appears on display 24. The ingredient time number represents the time (seconds) that a conveyor for a particular ingredient should operate. During operation the weight of a timed ingredient will be displayed rather than time. The existing ingredient time number may be superseded by operating the keyboard to provide a BCD signal corresponding to the number assigned to the desired time. More importantly the INGREDIENT TIME button is used to establish the ingredient time tolerance such that if the time of the ingredient is exceeded the basic processor halts the operation of the process.

The MIXER SELECT button is used when there is more than one mixer in the batching equipment. When this button is pressed, the mixer routine in the PROM memory means is activated. The word MIXER SELECT appears on display 25 and the existing mixer number appears on display 24. The mixer number identifies the mixer to be used for the selected formula. The existing mixer number may be superseded by operating the keyboard to provide a BCD signal corresponding to the number assigned to the desired mixer number.

When the MIX SLOW button is pressed, the mix slow routine in the PROM memory means is activated. The words MIX SLOW appear on display 25 and the existing mix slow number appears on display 24. The mix slow number represents the time (seconds) that the batch remains in the mixer programmed for this slow speed by the mix slow routine. The existing mix slow number may be superseded by operating the keyboard to provide a BCD signal corresponding to the number assigned to the desired time.

The function of the MIX FAST button is similar to the MIX SLOW button except the mix fast routine in the PROM memory means is activated to operate the mixer at fast speed and the keyboard means is used to change the mixing time, if desired.

When the ZERO TOLERANCE button is pressed, the zero tolerance routine in the PROM memory means is activated. The words ZERO TOLERANCE appear on display 25 and the existing zero tolerance number appears on display 24. The zero tolerance number represents the allowable variation weight (lb. or kg.) that the weigh hopper can deviate from zero and still be considered empty between batches. The existing zero tolerance number may be superseded by operating the keyboard to provide a BCD signal corresponding to the number assigned to the desired zero tolerance weight.

When the DATE button is pressed, the date routine in the PROM memory means is activated. The word MONTH or DAY appears on display 25 and the existing month or day number appears on display 24. The existing month or day numbers may be superseded by operating the keyboard to provide a BCD signal corresponding to the number assigned to the actual month or day.

The function of the TIME button is similar to the date button except the time routine in the PROM memory means is activated and hour and minute digits are used.

Each of the pushbutton switch means of OPERATE CONTROLS group 29 is connected to a different input of input matrix circuit boards that are also mounted on the back of the lower panel section of panel 22. These matrix circuit boards constitute a part of each of the pushbutton switch means of this group. The switch of each of these switch means is the non-locking type. The pressing of the button of each of these switch means activates a routine if that switch means is associated with a routine activated by pressing the AUTO button or SEMIAUTO button or associated with both of those routines. The function of each pushbutton switch means of group 29 is described below be reference to the button of each of each of these pushbutton switch means. When the button is mentioned there appears in parenthesis the letter A or the letter S or the designation A & S to indicate that switch means functions when its button is pressed after locking the AUTO or SEMIAUTO button.

When the OPERATOR button (A&S) is pressed, the operator routine in the PROM memory means is activated, the word OPERATOR appears on display 25 and the operator identification number appears on display 24. The operator number may be superseded by operating the keyboard to provide a BCD signal corresponding to the number assigned to the desired operator.

When the INVENTORY button (A&S) is pressed, the inventory display routine in the PROM memory means is activated and the word INVENTORY appears on display 25. When the bin number for the inventory to be checked is inserted at the keyboard, the word INVENTORY is replaced by the word BIN with the bin number display in panel 25. By pressing the + button, the total weight of the material used from the selected bin is displayed on display 24. By re-entering the bin number and pressing the − button, the total weight number for the selected bin is cleared from memory so that a new inventory total can be initiated. By pressing the HALT button while in the inventory mode, all inventory totals will be cleared. Caution must be exercised so that the + key is always pressed after entering a bin number otherwise the previous bin total remains on the numeric display. Also, caution must be exercised is using the − key to clear totals to avoid inadvertently clearing a wrong bin.

The FORM button (A&S) and the keyboard are used to select the formula to be batched. When this button is pressed, the formula routine in the PROM memory means is activated. The word FORMULA appears on display 25 and the previously used formula number appears on display 24. The previously used formula number may be superseded by pressing the appropriate button(s) on the keyboard. The functions of the FORM button is the same for the AUTO or SEMIAUTO mode.

When the SEQUENCE button (A) is pressed, the sequence routine in the PROM memory means is activated and the existing sequence numbers appear on display 24. The sequence numbers represent the order in which the ingredient bins are automatically fed into the weigh hopper for the cycle of operation of batching that formula. There can be a maximum of eight sequence numbers with a cursor to indicate which number will be changed if a keyboard button is pressed. An example of the sequence number display is as follows: 1 2 3 5 7 10 8 9. When the SEQUENCE button is pressed the cursor will always point to the first sequence number. Each time the − button is pressed the cursor moves to the next sequence number from left to right. Each time the + button is pressed the cursor moves to the next sequence number from right to left. The sequence number directly to the left of the cursor can be changed by pressing the appropriate keyboard buttons 0 thru 9. A zero sequence number will cause the system to terminate the batch cycle and omit the sequence numbers to the right of the zero position.

When the BATCHES REQ'D button (A) is pressed, the batches required routine in the PROM memory means is activated. The words BATCHES REQUIRED appear on display 25 and the existing batches required number appears on display 24. The batches required number indicates the number of batches the system will automatically prepare before stopping. The existing batches required number may be superseded by operating the keyboard to provide a BCD signal corresponding to the number assigned to the desired number.

When the ZERO button (S) is pressed, the zero routine in the PROM memory means is activated. The word ZERO appears on display 25 and the zero number appears on display 24. The zero number indicates that the weight of the weigh hopper (empty or with ingredients) has been subtracted from itself, and the difference (±00001) has been stored in the RAM memory means. This stored number is then used as a base to weigh the next ingredient. In some cases it may be necessary to press the ZERO button more than once to get the required zero number.

When the INGRED button (S) is pressed, the ingredient routine in the PROM memory means is activated. The word INGREDIENT appears on display 25 and the previously used ingredient number appears on display 24. The ingredient number indicates the associated bin from which the ingredient will be fed. The previously used ingredient number may be superseded by operating the keyboard to provide a BCD signal corresponding to the number assigned to the desired ingredient number.

When the START Button (A&S) is pressed, the start routine in the PROM memory means for either the semiautomatic mode or automatic mode of operation is activated. In the semiautomatic mode the formula, preset and ingredient parameters appear on display 25. In the automatic mode the formula, preset ingredient and batches remaining parameters appear on display 25. The ingredient net weight or batch net weight appears on display 24 for both modes. The lamp display shows the progress of the batching process for both modes. The batching process is manually controlled in the semiautomatic mode and automatically controlled in the automatic mode.

When the WEIGH HOPPER button (S) is pressed, the weigh hopper dump routine in the PROM memory means is activated. The progress of the dumping action is shown on the lamp display by the weigh hopper DUMP lamp. The weigh hopper dump routine will not accept a BCD signal from the keyboard.

When the MIXER DUMP (S) button is pressed, the mixer dump routine in the PROM memory means is activated. The progress of the dumping action is shown on the lamp display by the mixer DUMP lamp. The dump mixer routine will not accept a BCD signal from the keyboard.

When the TOTAL WEIGHT button (S) is pressed, the total weight routine in the PROM memory means is activated. The total net weight in the weigh hopper at this moment will be displayed on display 24. The total weight routine will not accept a BCD signal from the keyboard.

When the PRINT button (A&S) is pressed, the print routine in the PROM memory means is activated and the word PRINT appears on display 25. The batching system will provide printout data as selected by other operator control buttons or as pre-programmed into the basic processor.

When the PAUSE button (A) is pressed the pause flag is set in the CPU unit. This flag prevents the weigh hopper from dumping into the mixer at the end of the weigh cycle. While the pause flag is set, the weighing and mixing processes continue until the weigh hopper is full. At this point the weighing process stops, the word PAUSE is displayed, but nothing is dumped until the restart button is pressed and the pause flag is removed. The pause flag is removed by pressing the RESTART button.

When the TRIM button (A&S) is pressed, the trim routine in the PROM memory means is activated. This button is only used to add additional ingredient when an ingredient weight is below tolerance. By holding the TRIM button in the depressed position the conveyor for the ingredient with low weight operates. Releasing the TRIM button stops the conveyor. The trim routine will not accept a BCD signal from the keyboard. The function of the TRIM button is the same for the AUTO or SEMIAUTO mode.

The ACCEPT Button (A&S) functions as part of the tolerance routines in the PROM memory means. When an ingredient net weight is below tolerance, the batching process stops and the below tolerance routine is activated. The TRIM button or the ACCEPT button may be pressed. If the ACCEPT button is pressed the under weight ingredient will be accepted and the batching process will continue from where it was stopped.

When an ingredient net weight is above tolerance, the batching process stops and the above tolerance routine is activated. The ACCEPT button may be pressed to accept the overweight ingredient and resume the batching process from where it was stopped. The tolerance routines will not accept a BCD signal from the keyboard. The function of the ACCEPT button is the same for the AUTO or SEMIAUTO mode.

THE RESTART button (A&S) functions as part of the halt routine in the PROM memory means. The halt routine is activated automatically or when the HALT button is pressed. An automatic halt will occur when any of the valves, gates, or feeders are not operated properly. When the RESTART button is pressed the batching process is resumed at the point where it was halted. The halt routine will not accept a BCD signal from the keyboard. The function of the RESTART button is the same for the AUTO or SEMIAUTO mode.

Figure 2:
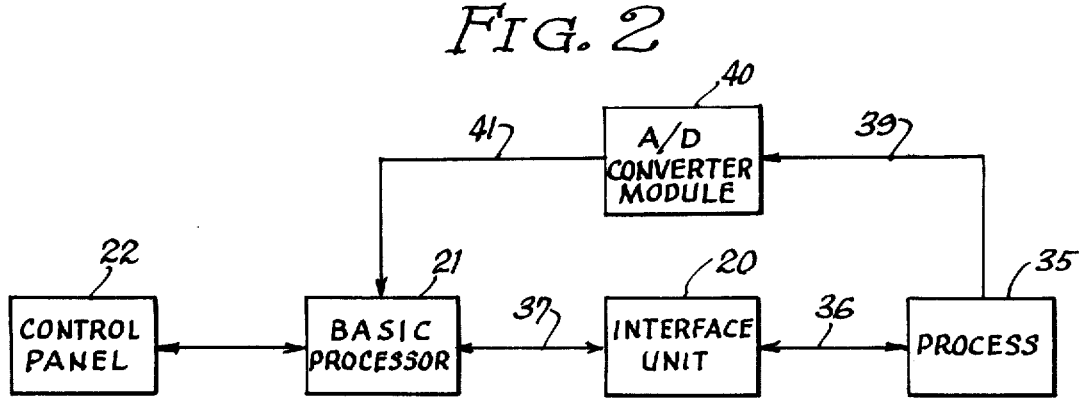
FIG. 2 is a simplified block diagram of the batching system of the present invention.

Referring to FIG. 2, that shows by a block diagram the system of the invention, the equipment 35 of the batching process is identified as a block entitled process. Signals to the batching system indicate the status of various components of the equipment. These are signals such as signals from contact closures from the high-level and low-level sensors mounted on the storage bins, from the gates of the bins, the weigh hopper and the mixers, from the diverter, from the feeder position detectors, from contact closures from the motors driving the feed conveyors at fast and slow speed, and the motors operating the mixers at slow or fast speed, and from contact closures from the sensors for the surge bins. The sensor outputs are connections to interface unit 20 shown in FIG. 2 as line 36. That line has an arrow in both directions because it represents connections from relays in the interface unit 20 to motors that operate the gates of the storage bins and of the weigh hopper, the diverter between the hopper and the mixers, the gates that are operated to dump material from the mixers, and the motors for the feed conveyors and the mixers. FIG. 1 shows by dotted lines, with arrows, the connection between the equipment and the system.

The interface unit 20 contains the relays, power drivers and optical isolators to operate the process controls such as the feeders, gates, diverters, etc., mentioned above. Optical isolators are in driving circuits of the output relays and in the receiving circuits. The interface unit 20 also includes serial transmitters and receivers, such as Tel-M transmitters and receivers, to communicate through a 2-wire line 37 with basic processor 21. The optical isolators are on an interface circuit board 38 that is actually a part of unit 20 that serves by its circuitry as a connection of interface unit 20 to basic processor 21 through line 37. Circuitry can be on circuit board 38 to permit connections of a cassette recorder or a Teletypewriter to basic processor 21. This optional feature is shown in FIG. 4 by unnumbered lines to and from interface circuit board 38.

FIG. 1 also shows the analog signal from the load cells on which the weigh hopper is mounted. This analog signal is shown in FIG. 3 as sent by a 2-wire line 39 from process 35, i.e., from the load cells (FIG. 1) to the batching system, specifically to an analog/digital (A/D) converter module 40. The A/D converter module 40 includes a preamplifier and an A/D converter. The A/D converter module 40 operates on a number of successive approximations. The function of A/D converter is to continually resolve the input voltage from the load cell output into 14 binary bits that are stored in a data register of module 40 and are available as a parallel binary output by a ribbon cable designated as line 41 to an input circuit board 42 (FIG. 4). The input circuit board 42 is connected to a master communications bus 44. The analog signal has been thermal zeroed, filtered digitized by the time it arrives at bus 44.

In FIG. 4 the basic processor 21 is shown as including communications bus 44 as a part of processor 21, and other circuit boards mentioned below. Some of the circuit boards are shown within the dotted rectangular outline of processor 21 but they are not a part of processor 21 but provide and receive information from it. This showing is for convenience. Of course, those circuit boards provide information from and to control panel 21, from A/D converter module 40, and from and to interface unit 20. Of course, those circuit boards are connected to bus 44.

The 2-wire line 37 that connects interface circuit board 38 and basic processor 21 does so by connecting line 37 to an input/driver circuit board 46 and by 47 to input/driver circuit boards 48. The boards 46 and 48 are plugged into bus 44.

The basic processor 21 includes RAM memory means, PROM memory means and a central processing unit. These are provided by a RAM circuit board 49, PROM circuit board 50 and a CPU circuit board 51.

As seen in FIG. 4 there are also an output/driver circuit board 52, an output/driver circuit board 53 and an interrupt circuit board 54 that are plugged into bus 44.

The CPU circuit board 51 contains a CPU chip, illustratively a Intel 8008 CPU (a product of Intel Corp.) and various other control and timing logic circuits. The 8008 CPU chip is an 8-bit parallel processor that contains registers, an accumulator, flag bits, an arithmetic unit, a 14-bit program counter, and a memory stack containing seven 14-bit words of memory. Time multiplexing of the 8-bit parallel bus of communications bus 44 permits communication between the CPU chip and any location in memory or any control information.

As stated above, CPU circuit board 51 includes a CPU chip and various other control and timing logic circuits. The illustrative circuit board includes a 1M Hz oscillator that provides a clock signal to bus 44 and to a basic timing element generator that provides pulses to the CPU chip and to a second generator that also provides pulses to the chip. Also on CPU circuit board 51 are a decoder, a timing and control logic, an input/output buffer logic, latches and output gates. The input/output buffer logic provides and receives from the CPU chip the input/output data. The input/output buffer logic is connected to bus 44 to receive input data and to provide output data to bus 44. The CPU chip is connected to the decoder to provide status signals to the latter. The decoder provides signals to the timing and control logic that provides strobes to the latches that are provided with buffered latch inputs from the input/output buffer logic. These latches are connected to the output gates to provide address bits to bus 44 and provide device control bits to the timing and control logic. The timing and control logic provides input/output buffer strobes to bus 44, receives an interrupt signal from bus 44, and provides a memory write strobe and an interrupt accepted strobe to bus 44. The timing and control logic provides four different CCPU state strobes to bus 44. The decoder will provide a stop strobe to bus 44.

Each RAM circuit board 49 contains a maximum of 16 Intel 2102 RAM chips and associated decoder circuits. The 2102 RAM chip is a 1024 word by one bit static random access semiconductor memory element integrated with its associated control logic on a monolithic array. Data are read out nondestructively and the output data have the same polarity as the input data. Data stored in the RAM chips is lost when power is removed from the chip. The RAM chips are used to store the operator's input program from control panel 22 and all processing data. The RAM chips are wired to two groups of eight chips on each circuit board. Each group of eight chips can store 1024 8-bit words; therefore, each circuit board can store 2048 8-bit words. The decoder circuits control the addresses for all the 8-bit words on each circuit board. The decoder circuits contain DIP switches that are set for the desired address numbers.

The associated circuits, that are on each RAM circuit board 49 with RAM chips, include programmable address switches, gates, a NAND gate and a write logic. The RAM chips are coupled to master bus 44 to receive address bits and CPU data output and to provide CPU data input. The programmable address switches receive address bits and device control bits from bus 44 and provide output to the NAND gate. Other inputs to the NAND gate are device control bits and an interrupt accepted signal from CPU circuit board 51 via bus 44. The output of the NAND gate is to the gates that for each have an input to receive an address bit by coupling to bus 44. These gates provide enable signals to the RAM chips. The write logic is coupled to the RAM chips and to the master bus so that the enabled RAM chip or chips will provide CPU input data to bus 44.

Each PROM circuit board 50 contains 8 Intel 1702 PROM chips and associated decoder circuits. The 1702 PROM chip is a 256 word by 8-bit static programmable read only semiconductor memory element integrated with its associated control logic on a monolithic array. The PROM chip has a transparent quartz lid that permits erasing of the bit pattern by ultraviolet light. A new bit pattern can then be electrically written into the chip. The bit pattern can readily be changed if the system is to be used in a "permanent" modification of the batching process or for use of the system with other equipment. Data stored in the PROM chips are not lost when power is removed from the chip. The PROM chips are used to store the permanent system program, including instructions to CPU circuit board 51 when routines of the PROM chips are activated by key switch 27 and the pushbuttons on the lower panel section of panel 22 of the control console or when PROM chips are addressed when there are signals from interface unit 20 or A/D converter module 40 in bus 44. Each PROM circuit board can store 2048 8-bit words. The decoder circuits control the addresses for all the 8-bit words on each circuit board. The decoder circuits contain DIP switches that are set for the desired address numbers.

The associated decoder circuits on PROM circuit board 50 include programmable address switches, a NAND gate, programming logic, and a decoder. The PROM chips are coupled to bus 44 to receive address bits and to provide CPU input data. The programmable address switches are provided address bits and control bits from bus 44. The output of these switches is an input to the NAND gate that also receives device control bits and any interrupt accepted signal from CPU circuit board 51 via bus 44. The output of a NAND gate is coupled to the programming logic that provides program signals to the 2048 bit ROM matrix bit of the PROM chip. The NAND gate is coupled to the decoder that is coupled to bus 44 to receive address bits. The outputs of the decoder are connected to output buffers of the PROM chips and a signal from the decoder provides the output data from the PROM chip to bus 44.

Each of the output/driver circuit boards 52 and 53 contains address decoder circuits, high and low address latch circuits, and 16 driver circuits. These circuit boards plug into the master bus and connect to the displays and lamps by ribbon cables. The address decoder circuits contain DIP switches that are set to accept certain addresses that control the high and low address latches. Data from the bus 44 are fed through the latches and drivers to displays 24 and 25 and to the lamps. These data control the displays and lamps.

The input circuit board 42 contains address decoder circuits and 8 high and 8 low buffer amplifiers. The circuit board 42 plugs into bus 44 and connects to A/D converter module 40 by ribbon cables. The address decoder circuits contain DIP switches that are set to accept certain addresses that control the high and low buffer amplifiers. Data from the A/D converter are fed through the high and low buffer amplifiers to bus 44. These data are used by the CPU and memories to update the weigh parameters and control the weigh process.

Each input/driver circuit board contains a combination of input and output driver circuit board components. The circuit board 48 also is plugged into bus 44 and is connected to the matrix circuit boards, located under the control panel buttons, by a ribbon cable. The circuit boards receive and transmit data in a manner similar to that described in the two next preceding paragraphs. These data are used by the CPU and memories to update the weigh parameters and control the weigh process.

The input matrix circuit boards serve as an interface between input/driver circuit board 48 and key switch 27, the groups of switch means of the set-up controls and the operate controls and the other pushbutton switch means, except the power switch means, on control panel 20.

Lamp driver circuit boards 56 and 57 serve as an interface between the panel lamps and output/driver circuit board 52. A lamp driver circuit board 58 has its outputs connected to a LED display circuit board 59 that includes display 24. The board 58 provides an interface between display 24 and board 52. The outputs of circuit boards 56 and 57 are connected to a socket adaptor 60 to which the lamps are connected. These circuit boards are located on the rear of the upper panel section of panel 22. The output/driver circuit board 53 serves as an interface between bus 44 and display 25.

The interrupt circuit board 54 contains electronics that detect when power to the system is interrupted and initiated and ascertains that the system will return to the same state when power is restored. The circuitry can interrupt the basic processor as it is cycling through the permanent program stored in the PROM chips of boards 50 the circuitry on board 54 provides the interrupt signal via bus 44 to CPU circuit board 51 and to other circuit boards. During this interruption different instructions may be inserted into the program. After these instructions are executed the CPU chip returns its status to the point where it was interrupted. The board 54 also contains a 60 Hz real time clock to provide an interrupt time base for the operation of the system.

An adjust circuit board (not shown) contains electronics and several replaceable diodes for setting in values for the following parameters: formula table limit; relay delay; bins in system; weighments for average; weighment delay; division for average; mixer dump time; dump tolerance time; final dump time; formula limit; ingredient delay; overload low; and overload high.

The A/D converter module 40 is an assembly of a preamplifier circuit board 64 (FIG. 4) containing a preamplifier and associated circuitry, and an A/D converter circuit board 65 containing the A/D converter and associated circuitry including the date register mentioned earlier.

As seen in FIG. 4, the system of the invention is connected to a low-voltage power supply 66 and a high-voltage power supply 67 that are connected in the illustrative embodiment to a 115 Vac power source. For the matrix circuit boards of the groups of pushbutton switch means and the matrix circuit board of the key switch means, keyboard switch means, and pushbutton switch means 31 through 33, that are mounted on the lower panel section of panel 22, for displays 24 and 25 and the lamps on the upper panel section of panel 22, for the load cells, for the A/D converter module (as shown by a line to circuit board 65), for interface circuit board 38, and for various components of basic processor 21 the low-voltage power supply 66 provides the following dc voltages: +4.5, ±5, −9, ±12, +13.5, and ±15.

The system is provided with standby power by batteries 68 that are connected only to communications bus 44 for the purpose of providing standby power to the RAM chips of circuit boards 49. The set-up variables that are stored in the RAM memory means will lose their data if supply voltage is removed. This is the reason for the use of batteries 68 that, of course, will protect the stored data only for a limited period of time.

The high-voltage power of supply 67 is +250 Vdc for alphanumeric display 25.

In the earlier description of the various pushbutton switches mounted on the lower panel section of panel 22, it has been stated that some of them, after pressing the pushbutton, can be followed by operating the keyboard. It is stated further that this operation of the keyboard provides an entering or a change of a stored number by providing a BCD signal. It is apparent from the still earlier description of keyboard means 26 that the pressing of any button of the keyboard provides a BCD digit and the BCD signal is that digit if the decimal number to be entered has only one digit. However, if the number is more than one digit, each pressing of a button provides a BCD digit and each is sent to the basic processor. In that case, the BCD signal mentioned above is actually a sequence of BCD digits.

The following describes the set-up procedure to change data stored in the RAM memory means, i.e., the RAM chips on boards 49. The steps, including the part of a step in which new numbers are entered by pressing one or more of the pushbuttons of keyboard means 26, are as follows:

1. Insert key in keyswitch means 27 and turn the keyswitch from OFF to SET UP. Check display 25 for the words SET UP.
2. Press FORM button and check displays. Enter new formula number (max. 2 digits) if necessary and check displays.
3. Press INGRED button and check displays. Enter new ingredient number (max. 2 digits) if necessary and check displays. Note: Steps 4 through 8 may be performed in any desired sequence.
4. Press PRESET button and check displays. Enter new preset number (max. 4 digits) if necessary and check displays. For a timed ingredient set all preset digits to zero.
5. Press PRELIM button and check displays. Enter new preliminary number (max. 3 digits) if necessary and check displays. For a timed ingredient set all preliminary digits to zero.
6. Press PREACT button and check displays. Enter new preact number (max. 3 digits) if necessary and check displays. For a timed ingredient set all preact digits to zero.
7. Press INGRED WT TOL button and check displays. Enter new weight tolerance number (max. 3 digits) if necessary and check displays.
8. Press INGRED TIME button and check displays. Enter new ingredient time number (max. 3 digits) if necessary and check displays.
9. Repeat steps 3 through 8 for each separate ingredient in the selected formula.
10. Press MIXER SELECT button and check displays. Enter new mixer number (max. 1 digit) if necessary and check displays.
11. Press MIX SLOW button and check displays. Enter new mix slow number (max. 3 digits) if necessary and check displays.
12. Press MIX FAST button and check displays. Enter new mix fast number (max. 3 digits) if necessary and check displays.
13. Repeat steps 2 through 12 for each formula.
14. Press ZERO TOLERANCE button and check displays. Enter new zero tolerance number (max. 2 digits) if necessary and check displays.
15. Press DATE button and check displays. If necessary, enter new month number (2 digits) and check displays Enter a third digit to advance system to accept the day digits. Enter new day number (2 digits) and check displays.
16. Press TIME button and check displays. If necessary enter new hour number (2 digits) and check displays. Enter a third digit to advance system to accept the minute digits. Enter new minute number (2 digits) and check displays.

In the foregoing description of the setup procedure, reference has been made in parenthesis to a maximum number of digits. These limitations relate to the construction of the embodiment of the system that is being described.

The sequence for the semiautomatic operating procedure using the system comprises the following steps:

1. Insert key in keyswitch means 27 and turn the keyswitch to OPERATE. The word OPERATE will appear on display 25.
2. Press the SEMIAUTO button.
3. Press the OPERATOR button and check displays. The word OPERATOR will appear on display 25 and the existing operator number will appear on display 24. If a different operator number is desired, enter new number at the keyboard and check display 24 for the new number.
4. Press the FORM button and check displays. The word FORMULA will appear on display 25 and the existing formula number will appear on display 24. If a different formula is desired, enter new formula number (max. 2 digits) at the keyboard and check display 24 for the new number.
5. Press the INGRED button and check displays. The word INGREDIENT will appear on display 25 and the existing ingredient number will appear on display 24. If a different ingredient is desired, enter new ingredient number (max. 2 digits) at the keyboard and check display 24 for the new number.
6. Press the ZERO button and check displays. The word ZERO will appear on display 25 and a number within one of zero (±00001) will appear on display 24. The weight of the weigh hopper is now stored in the zero register.
7. Press the START button and observe displays and lamps. The FEED lamp for the operating feeder will light and if this is the first ingredient to enter the empty weigh hopper, the weigh hopper EMPTY lamp will go dark. The ingredient net weight will be accumulated on display 24. On display 25 the formula, preset, ingredient and batches required numbers will be displayed.
8. When the weight of the selected ingredient is reached the operating feeder stops and its associated FEED lamp goes dark. The INGRED COMPLETE lamp lights and the ingredient net weight may be checked on display 24.
9. If the ingredient net weight is within the ingredient tolerance, repeat steps 5 through 9 for the next ingredient. If the ingredient net weight is not within tolerance, either press the ACCEPT button to accept the weight as is, or add additional ingredient by pressing and holding the TRIM button until the required weight is reached. A third alternative is to physically remove ingredient from the weigh hopper. Now repeat steps 5 through 9 for the next ingredient.
10. When all ingredients have been weighed separately, press the TOTAL WT button and check the total weight that appears on display 24. If the total weight is satisfactory, press the WEIGH HOPPER DUMP button. The batch will be dumped into the preselected mixer and the DUMP lamp for the weigh hopper and the associated SLOW or FAST lamp for the mixer will light.
11. If desired, start repeating steps 4 through 10 for the next batch while the previous batch is mixing. If desired the mixer may be dumped at any time before the mix time has completed by pressing MIXER DUMP button.
12. The operator can stop the process at any time by pressing the HALT button. He can then continue the process by pressing the RESTART button. The system will restart at the same point at which it was halted.
13. If the total weight is desired at any particular time, press the TOTAL WT button and observe the total net weight on display 24.
14. If it is desired to observe or printout the inventory of any or all of the ingredients used, press the INVENTORY button and select the desired ingredient bin.
15. If a printout of the displayed weight or inventory is desired at any particular time, press the PRINT button.
16. Repeat steps 4 through 15 for each batch required.

The steps for an automatic operating procedure using of the system are as follows:

1. Insert key in keyswitch and turn keyswitch to OPERATE. The word OPERATE will appear on display 25.
2. Press the AUTO button.
3. Press the OPERATOR button and check displays. The word OPERATOR will appear on display 25 and the existing operator number will appear on display 24. If a different operator number is desired, enter new number at keyboard and check display 24 for the new number.
4. Press the FORM button and check displays. The word FORMULA will appear on display 25 and the existing formula number will appear on display 24. To advance to the next formula, enter new formula number (max. 2 digits) at keyboard and check display 24 for the new number.
5. Press the SEQUENCE button and check display 25. The letters SEQ and the existing sequence number will appear on display 25. To change the sequence, enter new sequence numbers (max. 8 numbers) at keyboard and check display 25 for the new numbers. Individual sequence numbers may be changed by using + and − keyboard buttons as described earlier.
6. Press the BATCHES REQD button and check displays. The words BATCHES REQUIRED will appear on display 25 and the existing batches required number will appear on display 24. To change the quantity of batches required, enter new batches required number (max. 3 digits) at keyboard and check display 24 for the new number.
7. Press the START button and observe displays and lamps. The FEED lamp for the operating feeder will light and if this is the first ingredient to enter the empty weigh hopper, the weigh hopper EMPTY lamp will go dark, and the ingredient net weight will be accumulated on display 24. On display 25 the formula, preset, ingredient, and batches remaining numbers will be displayed.
8. From this point on the system will automatically perform the following functions:

a. Weigh each ingredient in the batch.
   b. Dump the batch into the selected mixer.
   c. Mix the batch and at the same time proceed to weigh the ingredients in a new batch.
   d. Dump the mixer after the mix time is completed.
   e. Display ingredient and batch parameters on displays 24 and 25.
   f. Display the progress of the process on the panel lamps.
   g. Halt the process if any problems occur.

9. If the process is halted, either automatically or manually, it may be restarted after the problem has been cleared by pressing the RESTART button. During a halt, the system may be shifted from the automatic mode to the semiautomatic mode in order to facilitate clearing problems. To perform this shift the keyswitch must be set to OFF then to OPERATE.
10. If the weigh process halts due to an out-of-tolerance ingredient weight, three alternatives are available.

a. The ingredient weight may be accepted as is by pressing the ACCEPT button and then the RE- START button.
  b. Additional ingredient may be added by pressing and holding the TRIM button until the ingredient weight is within tolerance, then pressing the RESTART button.
  c. Physically remove ingredient from the weigh hopper, then pressing the RESTART button.

11. If it is desired to delay the dumping of the mixer into the batch receptacle, press the PAUSE button. The present batch weighing process will continue until all ingredients are weighed, then the process will stop. The process may be restarted by pressing the RESTART button.
12. If it is desired to observe or printout the inventory of any or all of the ingredients used, press the INVENTORY button and select the desired ingredient bin.
13. If a printout of the weight or inventory is desired at any particular time, press the PRINT button.

In the especially preferred embodiment of the system of the invention and of the console of the system, it includes in the construction of the system a capability of performing a diagnostic mode. For this purpose basic processor 21 has built into it diagnostic routines that are utilized to pinpoint the component or number of components that are not operative.

The following sets of steps provide a description of the use of built-in diagnostic routines. These sets of steps are switch tests, lamp tests, relay tests, PROM test, RAM test, clock test and adjust test. To start each of these tests, the switch of keyswitch means 27 is turned to SETUP and then to OFF, and then as described below a pushbutton in the right hand column of OPERATE CONTROLS 29 is pressed to initiate a diagnostic mode. This button that is first pressed is dependent upon which test is to be performed. To the right of these buttons there is shown in FIG. 3 words that designate the diagnostic test to be initiated by pressing that button. The indicia appearing along side of the button on panel 22 is ignored.

Switch Test

1. Depress the WEIGH HOPPER DUMP button.
2. Depress any button of the group 28 of set up control buttons or of the group 29 of the operate control buttons. Each of the pushbutton switches with these buttons has a 6-digit number assigned to it.
3. The bank number of the pushbutton switch that has had its button depressed will be displayed as the first 3 digits on display 24 and to the right of these 3 digits there will be displayed 3 more decimal digits. If the displayed number does not agree with the assigned 6-digit number that switch means is inoperative.
4. Repeat steps 1, 2 and 3 for each switch to be tested.

The pushbutton switches of set-up controls group 28 are arranged in two banks and have been assigned bank numbers 001 and 002 respectively while the 2 banks of pushbutton switches of operate controls group 29 have been assigned bank numbers 003 and 004. Each switch has been assigned a switch number that in many cases is the same number for switches of the set-up controls group 28 as those in the operate controls group 29; however, the displays differ in each of those cases by the bank number. The display 24 should show the 6 digits for a pushbutton that has been depressed. The operator of the diagnostic test refers to the display indicating the bank number and switch numbers that should appear when a specific button is pressed.

Lamp Test

1. Depress the MIXER DUMP button.
2. Using the buttons of keyboard means 26 enter 6 decimal digits corresponding to the 3 digits of a bank number and 3 digits of the lamp number that refers to a specific lamp on the upper panel section of panel 22. For example, to check the feed lamps of the 16 storage bins the first 8 lamps are assigned number 020 and the lamp numbers 001, 002, 003, 010, 020, 040, 100 and 200, while the next 8 lamps are assigned bank number 021 and each of the lamps is assigned a number corresponding to one of the lamps of the first set of 8 lamps. The other lamps, that are within the indicia for a weigh hopper and those below it, are assigned bank numbers 030 or 031 and are assigned lamp numbers that in some cases are the same for lamps with bank number 031 as for lamps with bank number 030. The selected lamp only should turn on.
3. Repeat steps 1 and 2 for each lamp to be tested. Lamps having a common bank number can be tested as a group by entering through the keyboard the common bank number of the group and then number 377 instead of any of the lamp number assigned to that group.

Relay Test

1. Depress the TOTAL WEIGHT button.
2. Using the keyboard enter a 6-digit number assigned to the relay to be tested. Refer to a relay table showing the numbers assigned to the selected relays. If that relay only does not activate if may be defective.
3. Repeat steps 1 and 2 for each relay to be tested.
4. Turn the switch of key switch means 27 to cancel this mode. (This should be done to complete the switch test and the lamps test stated above).

PROM Test

1. Depress the PRINT button.
2. Using the keyboard enter a 3-digit number for each PROM, one at a time.
3. The first 3 digits of display should show that correct PROM check sum. If the wrong number is displayed, the PROM chip may be defective.
4. Turn the switch of key switch means 27 to cancel this mode.

RAM Test

1. Depress the PAUSE button.
2. Using the keyboard enter 3 digits of RAM starting field followed by 3 digits of the last RAM field +1.
3. The RAM boards will be repeatedly tested with a one second pause if an error should occur. The display will indicate the error address. One pass through 377 on the right 3 digits displayed indicates test completed once.
4. Turn the switch of key switch means 27 to cancel this test mode.

Clock Test

1. Use a stop watch or watch with a second hand.

2. Depress the TRIM button. On panel 24 the left 3 digits display 1.0 seconds in octal and the right 3 digits display 0.1 seconds.
3. The following time elements of the master clock of the CPU chip may be checked:

10 seconds = $12_8$
   30 seconds = $36_8$
   1 minute = $74_8$
   2 minutes = $170_8$
   4 minutes = $360_8$ 4. Turn the switch of key switch means 27 to cancel this test mode.

Adjust Test

1. Depress the ACCEPT button.
2. Using the keyboard enter in the 3-digit octal from an adjustment card table. The display right 3 digits should indicate the OCTAL quantities as shown on adjustment card.
3. Turn the switch of the key switch means 27 to cancel this mode.

The ADJUST test permits examination of quantities set into the adjust circuit board that is mentioned above.

The ODT (octal debug) is an examination of any particular location in PROM and an examination and change of any particular location in RAM by pressing the RESTART button after the key switch has been turned to OPERATE and then back to OFF.

In the description of the switch test described above it has been stated that the pushbotton switches of set-up controls group 28 are arranged in two banks. Much earlier it has been stated that these pushbutton switches of the two banks are connected to matrix circuit boards. These are boards 70 and 71 shown by dotted rectangles on the lower panel section of panel 22 in FIG. 3. Similarly the pushbutton switches of the operate controls group 29 are described in the switch test as arranged in two banks and much earlier it has been described that these pushbutton switches of these two banks are connected to matrix circuit boards. These are matrix circuit boards 72 and 73 shown also by dotted rectangles on FIG. 3. It has been described also that keyboard means 26 is connected to a matrix circuit board and this is shown by a dotted rectangle as board 74 on FIG. 3. The key switch of switch means 27 and the switches of pushbutton switch means 31, 32 and 33 are connected to a matrix circuit board 74.

From the foregoing description of a preferred embodiment of the system of the present invention it is apparent that the system is versatile in many respects and permits an operator to do many things. These include the checking of entries or the changing of entries relating to formulas that he is to make and to control the operation of batching process equipment by utilizing pushbutton switches on the control console, when necessary, to continue a cycle of operation of the batching equipment.

The embodiment, that has been described, includes the capability of diagnosis by the operator as a check for defective components. This is possibe in a very simple manner by utilizing these same pushbutton switches, including in certain cases the use of a keyboard switch means.

In the summary of the invention the various components, that constitute the control console or the system of the invention, are mentioned in a specific manner; however, this is done not to limit the invention but solely for the purpose of providing some conntinuity of the description of the various components of the combination of the invention so that the summary is more readily understood.

It is seen that the control console of the invention is an assembly comprising two groups of pushbutton switch means, key switch means and keyboard switch means. The first group of pushbutton switch means includes a number of pushbutton switches that permit the introduction to the basic processor of information regarding various formulas to be made. These do not necessarily include some of the pushbutton switch means that have been described relative to a preferred embodiment. For example, the pushbutton switches having the PRESET, the PRELIM button and a PREACT button are not required to be present if the feeding of the ingredients is to be solely on a time basis. Instead the switch means having the INGRED TIME button is present. Alternatively, the latter can be dispensed and the other three pushbutton switches can be present. In the preferred embodiment all of these four switch means are present. Other pushbutton switch means that could be absent in a simplified system include those having the MIXER SELECT button, the MIX SLOW button and the MIX FAST and MIX SLOW buttons because the system contemplates the use of only one mixer and does not require 2 speeds for the mixer motor.

Many pushbutton switch means of the other group have been described and their buttons are shown with function-identifying indicia in FIG. 3. Some are mentioned in the summary of invention but most of this group are not necessary for the system in its broadest aspect. However, there are many advantages in having them present and used in connection with the control of the operation of the batching equipment. They provide functions in connection with an automatic or semiautomatic mode of operation of the batching equipment and a number of these are useful when the system in a preferred embodiment includes not only an automatic control or a semiautomatic control but both and further includes the construction of the key switch means to provide with a number of these pushbutton switches a means of checking of many components for defects in the use of the system of the invention for a diagnosis of components of the system.

Because of the construction of the system in its broadest aspect it is possible to add functions and control that are present in various embodiments of the invention, including the described preferred embodiment, that have the many advantages that are described.

The system of the invention not only provides for a convenient check on controlled operation of the batching equipment during it use in a batching process, it readily permits the introduction to stroage in RAM memory means much information that can be readily changed. For example, the formula can be changed with respect to an ingredient, an amount of an ingredient, the weight of feeding at a fast speed, a change in selection of mixer and its time at fast or slow speed. The system provides, as a check, a display of the changed information before the operator should proceed to make other changes or substitutions. Furthermore, it permits the easy change of the weight at which the feeder is stopped following which falling material completes the addition to the weigh hopper. This worthwhile adjustment can be readily made by the operator based on the experience of the nature of the ingredient, of the operation of the conveyor, etc. At the console the operator can follow the operation of the weighing process and can make decisions at various steps of the operation. Without moving away from the console he can make changes and at the same time he can observe visually the changes that are being made.

The invention is that claimed below in the broadest claim for the system and a control console of the system. Other claims are directed to aspects of the invention of a more limited nature.

The foregoing description has been presented solely for the purpose of illustration and not by way of limitation of the invention because the latter is limited only by the claims that follow.

We claim:

1. A control console useful in a system for the control and monitoring of the operation of a batching process of feeding and mixing ingredients of a formula of a number of products to be made, said system having a basic processor including a central process unit, PROM memory means and RAM memory means that are connected to a communications bus, with the PROM memory means permanently storing digital program information and with the RAM memory means storing changeable digital information in the basic processor for this control and monitoring of the operation of the batching process, which comprises:

a panel;

keyswitch means connectable to the bus and having a key switch mounted on said panel and turnable between a first position, a second position and an off position, and having circuitry connected to the keyswitch to provide, when the keyswitch is at said first and second positions, from that circuitry different digital signals;

a first group of pushbutton switch means connectable to the bus to provide digital information to be stored in the RAM memory means, said first group including first, second and at least one other pushbutton switch means, each of said first group having a pushbutton switch mounted on said panel and having circuitry connected to the pushbutton switch to provide, when the pushbutton of that switch is depressed, a digital signal from said circuitry that is a different digital signal than that of the other pushbutton switch means of said first group, each of said first group of pushbutton switch means being operative to provide its digital signal only when said digital signal is provided by said key switch means when its keyswitch is at said first position, said second pushbutton switch means being operative to provide said digital signal only when said digital signal is provided by said first pushbutton switch means, and said one other pushbutton switch means being operative to provide its digital signal only when said digital signal is provided by said second pushbutton switch means;

a second group of pushbutton switch means connectable to the bus to provide digital information to be stored in the RAM memory means, said second group including at least a first and a second pushbutton switch means, each of said second group having a switch mounted on said panel and having circuitry connected to the pushbutton switch to provide, when the pushbutton of that switch is depressed, a digital signal from said circuitry that has a different digital signal than that of other pushbutton switch means of said second group, and each of said second group of pushbutton means being operative to provide its digital signal only when said digital signal is provided by said keyswitch means when its keyswitch is at said second position; and keyboard means including a set of pushbutton switch means, each pushbutton switch means of said set having a pushbutton switch mounted on said panel and circuitry connected to the pushbutton switch to provide a signal, when the pushbutton of that switch is depressed, each of said circuitry of said set of pushbutton switch means providing a different BCD signal, each of said pushbutton switch means being operative to provide its BCD signal only when said digital signal is provided by said keyswitch means while its keyswitch is at said first or second position and said digital signal is provided by any one of said pushbuttons of said first group of pushbutton switch means or one only of said first and second pushbutton switch means of said second group.

2. The control console of claim 1 in which said circuitry of said keyswitch means, said circuitry of said first group of pushbutton switch means, said circuitry of said second pushbutton switch means and said circuitry of said keyboard means include:

matrix circuit board means mounted on said panel connected to said switch means; and input/driver circuit board means connectable to the bus and connected to said matrix circuit board means, said input/driver circuit board means transferring said digital signals and BCD signals from said key-switch means, said first group and second group of pushbutton switch means and said pushbutton switch means of said keyboard means and sending digital signals to said matrix circuit board means when signalled by the bus.

3. The control console of claim 1 and further including:

indicia on said panel as a graphical display of components of a batching equipment and the flow pattern between components of the equipment;

lamp means including lamps mounted on said panel in a manner relative to said indicia so that each lamp, when lit, provides a visual indication of the change of status of components or the operation of a cycle of a batching process using the equipment;

numerical display means mounted on said panel;

alphanumerical display means mounted on said panel;

circuit board means connectable to the bus to receive digital signals from the bus and connected to said lamp means, to said numerical display means and to said alphanumerical display means to light one or more of the lamps and to provide digital information to said numerical display means and said alphanumerical display means in accordance with the digital signals from the bus, said circuit board means providing these signals to said lamp means when said key switch is at its second position, and said circuit board means providing digital signals to said numerical display means and said alphanumerical display means when said keyswitch is at said first or second position and one of said pushbutton switches of said first group or of said first or second pushbutton switch of said second group has had its pushbutton depressed.

4. The control console of claim 3 in which said circuitry of said key switch means, said circuitry of said first group of pushbutton switch means, said circuitry of said second pushbutton switch means and said circuitry of said keyboard means include:

matrix circuit board means mounted on said panel connected to said switch means; and input/driver circuit board means connectable to the bus and connected to said matrix circuit board means, said input/driver circuit board means transferring said digital signals and BCD signals from said key switch means, said first group and second group of pushbutton switch means and said pushbutton switch means of said keyboard means and sending digital signals to said matrix circuit board means when signalled by the bus.

5. A system for the control and monitoring of the operation of a batching process of feeding, weighing and mixing ingredients of a formula of a number of products to be made which comprises:

a basic processor including:
  a communications bus;
  a central process unit connected to said bus;
  PROM memory means connected to said bus to permanently store digital program information; and
  RAM memory means connected to said bus to store changeable digital information;

A/D converter means connected to said bus and connectable to load cells monitoring a weigh hopper of equipment used in the batching process to convert to a digital signal an analog signal from the load cells that is indicative of the condition of the hopper when it is empty;

interface means connected to said bus and connectable to various components of the equipment in which the batching process is performed to interface these components with said basic processor to indicate their status when being used in the operation of the process, as converted digital signals, said interface means including circuit board means to provide said conversion of each of said signals to a digital signal and to transfer each digital signal to said bus and relay means to operate components of the equipment in accordance with digital signals from said basic processor; and a control console which comprises:

a panel;

keyswitch means connected to said bus and having a key-switch mounted on said panel and turnable between a first position, a second position and an off position, and having circuitry connected to the keyswitch to provide, when the keyswitch is at said first and second positions, from that circuitry different digital signals;

a first group of pushbutton switch means connected to said bus to provide digital information to be stored in said RAM memory means, said first group including first, second and at least one other pushbutton switch means, each of said first group having a pushbutton switch mounted on said panel and having circuitry connected to the pushbutton switch to provide, when the pushbutton of that switch is depressed, a digital signal from said circuitry that is a different digital signal than that of the other pushbutton switch means of said first group, each of said first group of pushbutton switch means being operative to provide its digital signal only when said digital signal is provided by said keyswitch means when its keyswitch is at said first position, said second pushbutton switch means being operative to provide said digital signal only when said digital signal is provided by said first pushbutton switch means, and said one other pushbutton switch means being operative to provide its digital signal only when said digital signal is provided by said second pushbutton switch means;

a second group of pushbutton switch means connected to said bus to provide digital information to be stored in said RAM memory means, said second group including at least a first and a second pushbutton switch means, each of said second group having a switch mounted on said panel and having circuitry connected to the pushbutton switch to provide, when the pushbutton of that switch is depressed, a digital signal from said circuitry that has a different digital signal than that of other pushbutton switch means of said second group, and each of said second group of pushbutton switch means being operative to provide its digital signal only when said digital signal is provided by said key switch means when its keyswitch is at said second position; and keyboard means having its circuitry connected to said bus and including a set of pushbutton switch means, each pushbutton switch means of said set having a pushbutton switch mounted on said panel and circuitry connected to the pushbutton switch to provide a signal, when the pushbutton of that switch is depressed, each of said circuitry of said set of pushbutton switch means providing a different BCD signal, each of said pushbutton switch means being operative to provide its BCD signal only when said digital signal is provided by said key switch means while its key switch is at said first or second position and said digital signal is provided by any one of said pushbuttons of said first group of pushbutton switch means or one only of said first and second pushbutton switch means of said second group, said digital signals that make operative the use of digital signals from various pushbutton switch means are processed by said basic processor to provide digital signals through said bus to those various pushbutton switch means to permit those digital signals to be input data to said basic processor.

6. The system of claim 5 in which said circuitry of said key-switch means, said circuitry of said first group of pushbutton switch means, said curcuitry of said second pushbutton switch means and said circuitry of said keyboard means include:

matrix circuit board means mounted on said panel connected to said switch means; and input/driver circuit board means connected to the bus and connected to said matrix circuit board means, said input/driver circuit board means transferring said digital signals and BCD signals from said keyswitch means, said first group and second group of pushbutton switch means and said pushbutton switch means of said keyboard means and sending digital signals to said matrix circuit board means when signalled by the bus.

7. The system of claim 5 and further including:

indicia on said panel as a graphical display of components of a batching equipment and the flow pattern between components of the equipment;

lamp means including lamps mounted on said panel in a manner relative to said indicia so that each lamp, when lit, provides a visual indication of the change of status of components or the operation of a cycle of a batching process using the equipment;

numerical display means mounted on said panel;
alphanumerical display means mounted on said panel;
circuit board means connect to the bus to receive digital signals from the bus and connected to said lamp means, to said numerical display means and to said alphanumerical display means to light one or more of the lamps and to provide digital information to said numerical display means and said alphanumerical display means in accordance with the digital signals from the bus, said circuit board means providing these signals to said lamp means when said keyswitch is at its second position, and said circuit board means providing digital signals to said numerical display means and said alphanumerical display means when said keyswitch is at said first or second position and one of said pushbutton switches of said first group of said first of second pushbutton switch of said second group has had its pushbutton depressed.

8. The system of claim 7 in which said circuitry of said keyswitch means, said circuitry of said first group of pushbutton switch means, said circuitry of said second pushbutton switch means and said circuitry of said keyboard means include:

matrix circuit board means mounted on said panel connected to said switch means; and input/driver circuit board means connected to the bus and connected to said matrix circuit board means, said input/driver circuit board means transferring said digital signals and BCD signals from said keyswitch means, said first group and second group of pushbutton switch means and said pushbutton switch means of said keyboard means and sending digital signals to said matrix circuit board means when signalled by the bus.

9. A system of claim 8 in which:

said keyswitch means at said first position activates a set-up routine of said basic processor that is required before the pressing of any pushbutton of the first group of pushbutton switch means to provide a digital signal through said bus to said basic processor for the use of said first group in combination with the use of said keyboard means to enter into said RAM means initial or changed information regarding amounts of ingredients of formulas, their control of feeding and to change these conditions for any formula or for the replacement of any formula;

said keyswitch means at said second position activates an operate routine of said basic processor that is required before the pressing of any pushbutton of said pushbutton switches of said second group to provide a digital signal through said bus to said basic processor for the use of said first pushbutton switch means of said second group in combination with the use of said keyboard means to change to a different entered formula for the next cycle of use of the system for the control and monitoring of the batching process and that is required before the pressing of the pushbutton of the second pushbutton switch means of said second group that provides a digital signal through said bus to said basic processor to start the operate routine for the control and monitoring of a cycle of operation of the batching process;

said first pushbutton switch means of said first group when operative activates a formula routine of said basic processor that provides through said bus a digital signal to said alphanumerical display means for a display indicating that the formula routine has been activated and a digital signal to said numerical display means for a display of the formula number assigned to a part of said RAM means that is presently addressed so that a change to address another portion of said RAM means for a different formula having another assigned number can be addressed by one or more pressings of that pushbutton or by operating said keyboard means;

said second pushbutton switch means of said first group when operative activates an ingredient routine of said basic processor that provides through said bus a digital signal to said alphanumerical display means for a display indicating that the ingredient routine has been activated and a digital signal to said numerical display means for a display of the ingredient number assigned to a part of said RAM means that is presently addressed so that a change to address another portion of said RAM means for a different ingredient having another assigned number can be addressed by one or more pressings of that pushbutton or by operating said keyboard means;

each of said other pushbutton switch means of said first group when operative activates other routines of said processor that provides through said bus a digital signal to said alphanumerical display means for a display indicating one of other routines have been activated and a digital signal to said numerical display means for a number in another portion of said RAM means, representing a condition to be met in the operation of the process, that can be changed to another number by operating said keyboard means;

said first pushbutton switch means of said second group when operative activates a formula routine of said basic processor that provides through said bus a digital signal to said alphanumerical display means for display indicating the formula routine has been activated and an additional signal to said numerical display means for a display of the formula number, so that a change to address another portion of said RAM means for a different formula having another assigned number by operating said keyboard means can be made;

said second pushbutton switch means of said second group when operative activates an operate routine of said basic processor to initiate, control and monitor a cycle of operation of the batching process and to provide through said bus during a cycle of operation a digital signal to said numerical display means for a display indicating that the net weight of ingredient already fed to the weigh hopper of the equipment and a digital signal to said alphanumerical display means for a display of the formula number being used and weight programmed for the ingredient being fed; and each of said other pushbutton switch means of said second group when operative activate other routines of the basic processor, said system further including indicia on said panel along side of said pushbutton means of said first and second groups to indicate the function of the routines activated through the pressing of the pushbuttons of said pushbutton switch means and indicia indicating the general function of each group.

10. The system of claim 9 and further including:

a pair of locking pushbutton switches connected to one of said matrix circuit boards and each being operative when said keyswitch is at the second position to provide a digital signal to the basic processor for one only of semiautomatic mode and automatic modes of operation of said basic processor of the operate routine; and said indicia of said second group of pushbuttons including indicia indicating both modes and indicia indicating for each button its function for one or both of these modes.

11. The system of claim 10 in which said keyswitch means is connected when in its off position to one of said matrix boards to provide a digital signal to said basic processor to activate a diagnostic routine in which:

each of some of said pushbutton switches of said second group being operative when said basic processor is in that diagnostic routine to provide for each a different test routine so that while said processor is in the diagnostic routine:

when one of said some pushbutton switches has its button depressed a test of any of said pushbutton switch means of said first and second groups can be made by pressing its pushbutton and checking the numerical display of a multidigit number on the said numerical display means to indicate whether the switch means having its button depressed is inoperative;

when a second of said some pushbutton switches has its pushbutton switch depressed a test of said lamps can be made by entering a multidigit number by said keyboard means and checking that the selected lamp only is lighted;

when a third of said some pushbutton switches has its button depressed a test of said relays of said relay means can be made by entering a multidigit number by said keyboard means and checking that the selected relay only is activated;

when a fourth of said some pushbutton switches has its button depressed a test of each PROM of said PROM means can be made by entering a multidigit number by said keyboard means and checking said numerical display means to see if it displays the correct RAM check sum;

when a fifth of said some pushbutton switches has its button depressed a test of said RAM means can be made by entering a multidigit number by said keyboard means and checking said numerical display means.

* * * * *

UNITED STATES PATENT AND TRADEMARK OFFICE
CERTIFICATE OF CORRECTION

PATENT NO. : 3,959,636
DATED : May 25, 1976
INVENTOR(S) : Bernard A. Johnson et al.

It is certified that error appears in the above-identified patent and that said Letters Patent are hereby corrected as shown below:

```
Column  1, line 32, "grapical" should read --graphical--.
Column  4, line  1, "operate" should read --of operate--.
Column  5, line 43, "addresses, decoder" should read --address
                    decoder--.
Column  7, line  7, "weight" should read --weigh--.
Column 12, line 45, "of each of each" should read --of each--.
Column 16, line  6, "filtered" should read --filtered and--.
           line 66, "CCPU" should read --CPU--.
Column 17, line 11, "wired to" should read --wired in--.
Column 25, line 33, "pushbotton" should read --pushbutton--.
Column 26, line 57, "it use" should read --its use--.
           line 58, "stroage" should read --storage--.
Column 30, line 45, "key-switch" should read --keyswitch--.
           line 46, "curcuitry" should read --circuitry--.
Column 31, line 16, "group of" should read --group or of--.
           line 17, "first of" should read --first or--.
Column 32, line 25, "have" should read --has--.
           line 67, "modes" should read --mode--.
```

Signed and Sealed this

Twenty-fourth Day of August 1976

[SEAL]

Attest:

RUTH C. MASON
*Attesting Officer*

C. MARSHALL DANN
*Commissioner of Patents and Trademarks*